United States Patent
Dawson

(10) Patent No.: US 6,604,175 B2
(45) Date of Patent: Aug. 5, 2003

(54) DATA CACHE AND METHOD OF STORING DATA BY ASSIGNING EACH INDEPENDENTLY CACHED AREA IN THE CACHE TO STORE DATA ASSOCIATED WITH ONE ITEM TYPE

(75) Inventor: Thomas Patrick Dawson, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 39 days.

(21) Appl. No.: 09/797,458

(22) Filed: Mar. 1, 2001

(65) Prior Publication Data

US 2002/0124141 A1 Sep. 5, 2002

(51) Int. Cl.[7] .............................................. G06F 12/00
(52) U.S. Cl. ........................ 711/133; 711/118; 345/552; 345/557
(58) Field of Search ............................ 711/5, 118–129, 711/131–134, 136, 145, 170–173; 709/215; 345/501, 531–564, 587, 582; 710/52

(56) References Cited

U.S. PATENT DOCUMENTS

| 5,787,473 A | * | 7/1998 | Vishlitzky et al. | 711/134 |
| 5,936,632 A | * | 8/1999 | Cunniff et al. | 345/430 |
| 6,000,019 A | * | 12/1999 | Dykstal et al. | 711/157 |
| 6,047,339 A | | 4/2000 | Su et al. | 710/56 |
| 6,115,793 A | * | 9/2000 | Gruber et al. | 711/133 |
| 6,192,428 B1 | * | 2/2001 | Abramson et al. | 710/52 |
| 6,389,504 B1 | * | 5/2002 | Tucker et al. | 711/100 |

* cited by examiner

*Primary Examiner*—Do Hyun Yoo
*Assistant Examiner*—Nasser Moazzami
(74) *Attorney, Agent, or Firm*—Meyer Fortkort & Williams, PC; Karin L. Williams, Esq.

(57) ABSTRACT

A memory system comprises a memory, a memory controller and a cache. The memory stores a plurality of data packets, which are associated with a plurality of data types. The memory controller receives requests for data packets from a processing unit and passes requested data packets from the memory to the processing unit. The cache comprises a plurality of independently cached areas. The memory controller passes requested data packets from the memory to the cache. The memory controller passes requested data packets from the cache to the processing unit in response to subsequent data packet requests from the processing unit to the memory controller. The memory controller assigns each independently cached area in the cache to store data packets associated with one item type where an item type may be a texture, thread, task or process. Each independently cached area is associated with a data usage indicator. The memory controller increments the data usage indicator of an independently cached area for each data packet passed from that independently cached area to the processing unit in response to a subsequent data packet request and decrements the data usage indicators of the other independently cached areas.

40 Claims, 5 Drawing Sheets

TEXTURE CACHE CONTROLLER MEMORY
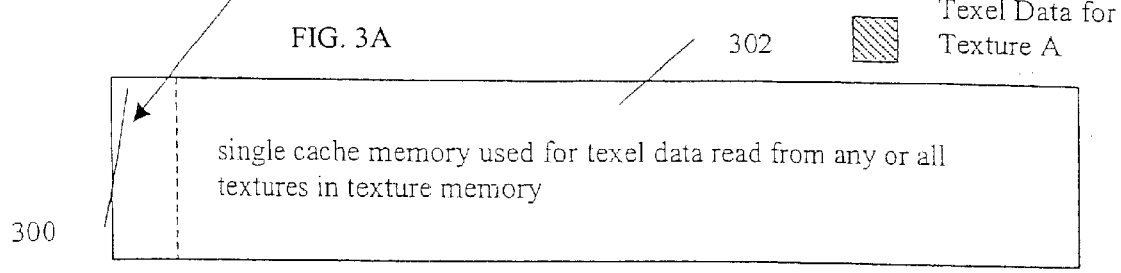
FIG. 3A
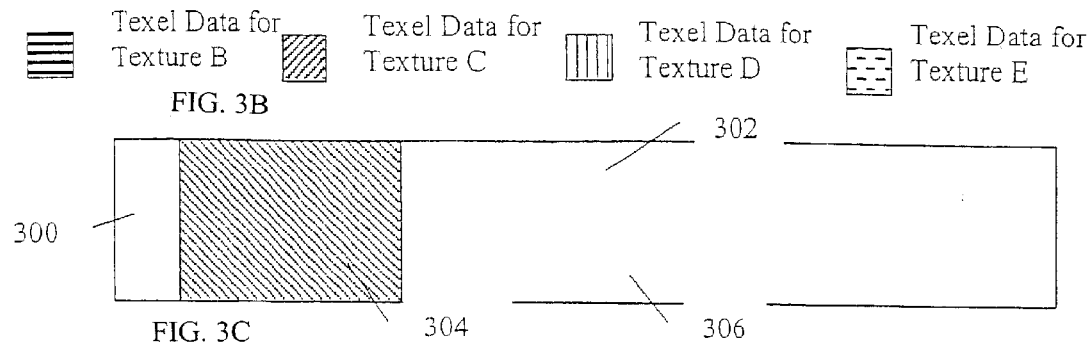
FIG. 3B
FIG. 3C
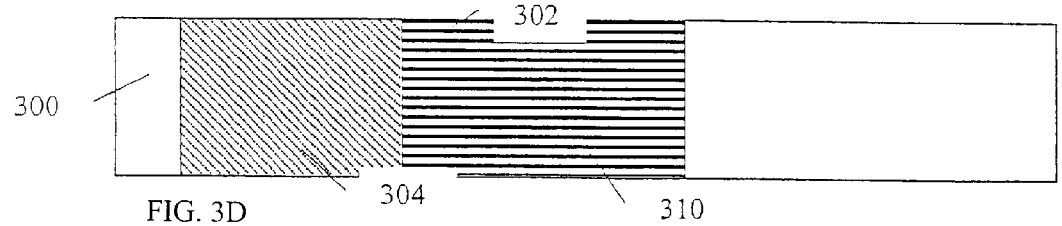
FIG. 3D
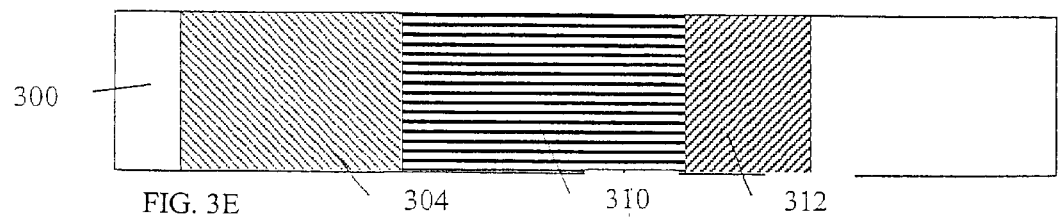
FIG. 3E
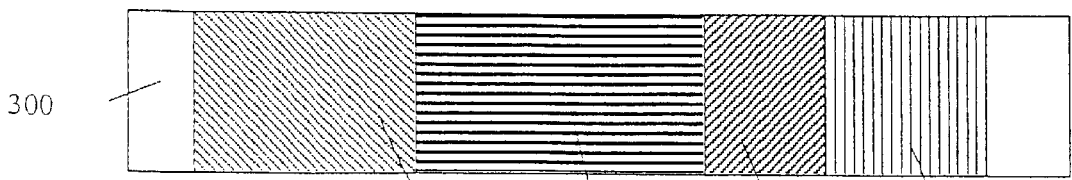
FIG. 3F
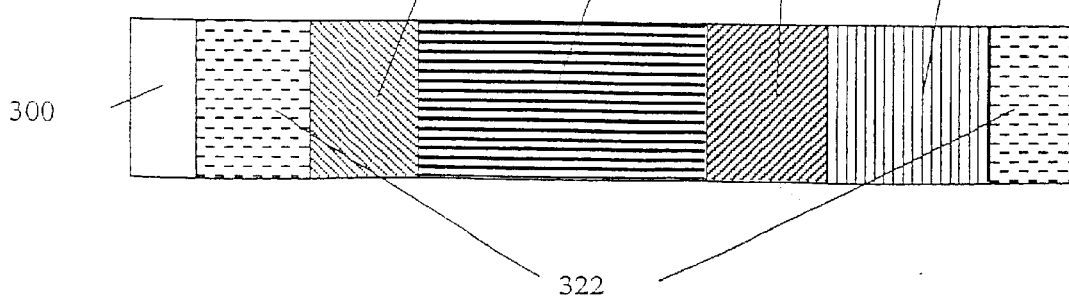

| TEXTURE ID | LOCATION OF THE ICA 402 IN THE CACHE 166 | SIZE OF THE ICA | TEXTURE USAGE INDICATOR | CLOSED FLAG |
|---|---|---|---|---|
| 501B | | | | |
| 501C | | | | |
| 501D | | | | |
| 501E | | | | |
| 501F | | | | |

FIG. 5

DATA CACHE AND METHOD OF STORING DATA BY ASSIGNING EACH INDEPENDENTLY CACHED AREA IN THE CACHE TO STORE DATA ASSOCIATED WITH ONE ITEM TYPE

BACKGROUND OF THE INVENTION

1. Field of the Invention

The present invention relates to storing and retrieving data. Specifically, the present invention relates to storing data in a cache and retrieving data from the cache.

2. Description of the Related Art

In computer graphics, existing texture-rendering techniques map a pixel on a screen (typically using screen coordinates (x, y)) to a polygon, such as a triangle, on a surface in a viewing plane (typically using geometric or surface coordinates (s, t)). The polygon is rasterized into a plurality of smaller pieces called fragments. Each polygon may have information, such as color and/or a normal vector, associated with each vertex of the polygon. To assign a texture (i.e., a color pattern or image, either digitized or synthesized) to a fragment, the fragment is mapped onto a texture map (typically using texture coordinates (u, v)). A texture map represents a type of image, such as stripes, checkerboards, or complex patterns that may characterize natural materials. Texture maps are stored in a texture memory. A texture map comprises a plurality of texels. A texel is the smallest graphical element in a 2-D texture map used to render a 3-D object. A texel represents a single color combination at a specific position in the texture map.

Each texture map has a plurality of associated MIP (multum in parvo) maps, which are abbreviated versions of a full texture map. One of the MIP maps may be selected to provide a suitable resolution for the fragment of the polygon being rasterized. Several techniques exist to interpolate the desired color information from one or more MIP levels. These texel selection techniques are known technology. The final texture color derived from the selected MIP map is applied onto the fragment. The applied texture may be blended with a color already associated with the fragment or polygon.

In a traditional graphics rendering pipeline/architecture, a texturing unit will access a texture memory via a texture cache. This traditional architecture treats the texture cache as a single large cache or lookup table created from most of the memory available in the texture cache. A texture memory controller passes new texel data packets from all the texture maps to the single texture cache. Any texel data from any texture map may overwrite texel entries from other maps. There are no provisions for dealing with texel data packets that are frequently re-used compared to texel data packets that are used only intermittently or infrequently. A frequently re-used texel data packet may be written over, reloaded again, written over and then reloaded again repeatedly. The operation of having a single cache handle texel data from many texture maps is inefficient.

SUMMARY OF THE INVENTION

A data cache and methods of organizing a data cache are provided in accordance with the present invention. In one embodiment, the methods of organizing a data cache are applied to a texture cache in a graphics rendering system. The texture cache is split into a plurality of individual, independently cached areas (ICAs), where each ICA is assigned to store the texel data packets associated with a particular texture. Each ICA has a texture usage indicator that indicates the frequency of read requests for texel data packets stored in that ICA. A particular ICA with texel data packets that are not frequently requested will be assigned to store texel data packets for another texture. An ICA with frequently used texels will remain available to the rendering engine. Thus, the texture cache according to the present invention is more efficient than a traditional texture cache.

Also, a texture ID may be removed from each texel data packet before the packet is stored in an ICA because each ICA is dedicated to store texel data packets for one texture. By storing texel data packets without a texture ID, more cache memory in the ICA is available to store other texel data packets.

In another embodiment, the methods of organizing a data cache are applied to a central processing unit (CPU) cache. According to the present invention, the CPU cache has a plurality of individual caches that store different types of CPU processes, such as threads or tasks, instead of texel data packets.

One aspect of the invention relates to a memory system comprising a memory, a memory controller and a cache. The memory is configured to store a plurality of data packets, which are associated with a plurality of data types. The memory controller is coupled to the memory. The controller is configured to receive requests for data packets from a processing unit and pass requested data packets from the memory to the processing unit. The cache is coupled to the memory controller. The cache comprises a plurality of independently cached areas (ICAs). The memory controller is configured to pass requested data packets from the memory to the cache. The memory controller is configured to pass requested data packets from the cache to the processing unit in response to subsequent data packet requests from the processing unit to the memory controller. The memory controller is configured to assign each ICA in the cache to store data packets associated with one data type. Each ICA is associated with a data usage indicator. The memory controller is configured to (1) increment the data usage indicator of an ICA for each data packet passed from that ICA to the processing unit in response to a subsequent data packet request and (2) decrement the data usage indicators of other ICAs.

Another aspect of the invention relates to a method of storing data. The method comprises storing a plurality of data packets in a memory, where the data packets are associated with a plurality of data types; receiving requests for data packets from a processing unit with a memory controller coupled to the memory and passing requested data packets from the memory to the processing unit; passing requested data packets from the memory to a cache and passing requested data packets from the cache to the processing unit in response to subsequent data packet requests from the processing unit to the memory controller, where the cache comprises a plurality of independently cached areas; assigning each independently cached areas in the cache to store data packets associated with one data type, where each independently cached area is associated with a data usage indicator; incrementing the data usage indicator of an independently cached area for each data packet passed from that independently cached area to the processing unit in response to a subsequent data packet request; and decrementing the data usage indicators of other independently cached areas.

BRIEF DESCRIPTION OF THE DRAWINGS

FIG. 3A illustrates one embodiment of a traditional memory allocation for the texture cache in the texturing system of FIG. 1.

FIGS. 3B–3F illustrate exemplifying mapping configurations of the texture cache in FIG. 3A after a plurality of retrieved texel data packets have been written by the texture memory controller of FIG. 1.

FIG. 5 illustrates one embodiment of texture cache control registers used by the texture memory and cache controller in FIG. 1.

DETAILED DESCRIPTION

Figure 1:
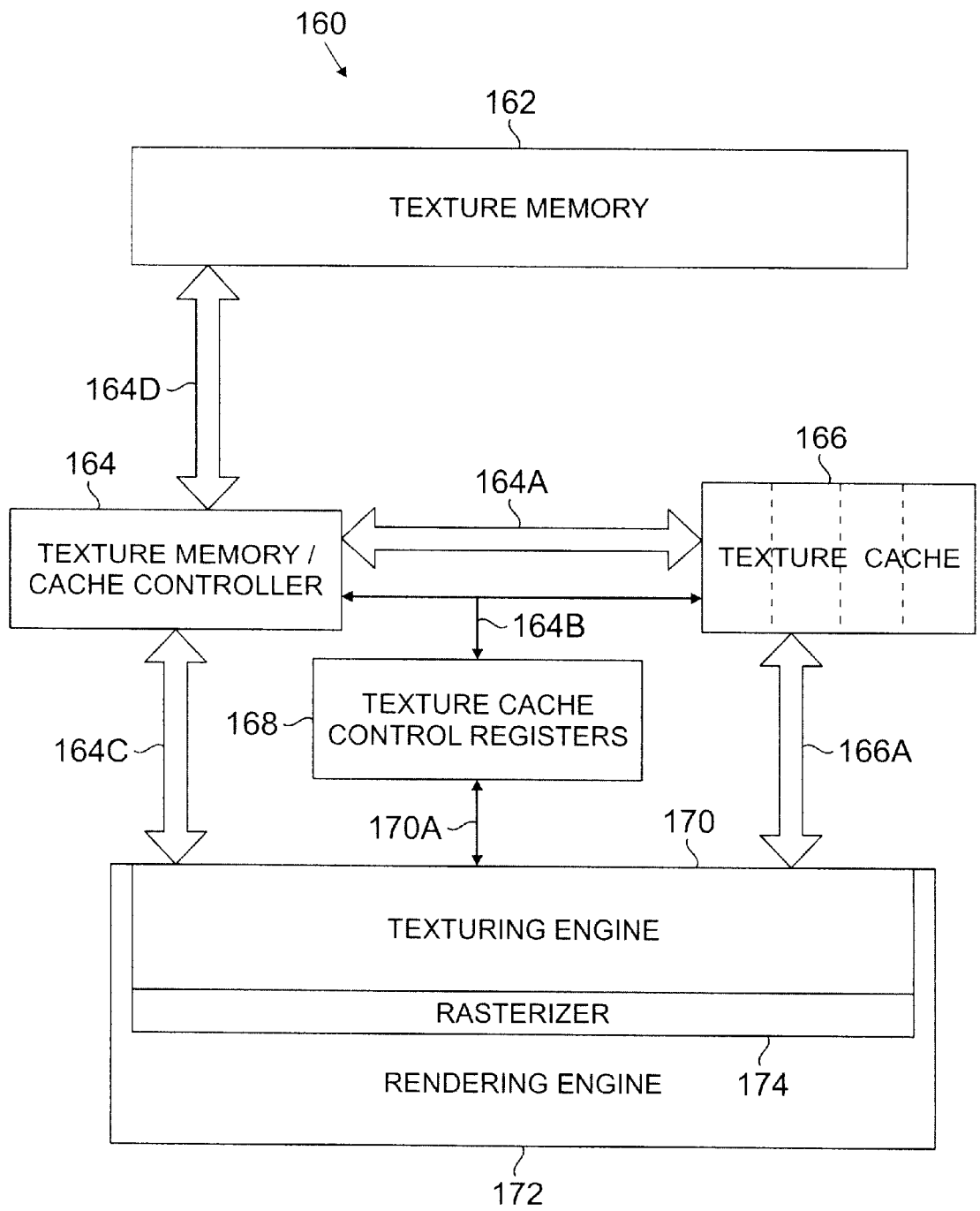
FIG. 1 illustrates one embodiment of a texturing system in accordance with the present invention.

FIG. 1 illustrates one embodiment of a texturing system 160 in accordance with the present invention. The texturing system 160 comprises a texture memory 162, a texture memory and cache controller 164 (hereinafter referred to as texture memory controller 164), a texture cache 166, a set of texture cache control registers 168, a texturing engine 170, a rasterizer 174, and a rendering engine 172.

Various types of memories, caches, controllers, registers and/or processing components may be used in accordance with the present invention. The scope of the present invention is not limited to a particular type of memory, cache, controller, register and/or processing component. Various embodiments of the texturing system 160 may comprise other components in addition to or instead of the components shown in FIG. 1 without departing from the scope of the invention. For example, the texturing system 160 may comprise additional memories, caches, controllers, registers and/or processing components.

The components shown in FIG. 1 may be implemented with software, hardware or a combination of software and hardware. In one embodiment, the texturing system 160 is part of a hardware-based graphics rendering system, where the texture memory 160 is 'off-chip,' and the rest of the components in FIG. 1 are implemented with an Application Specific Integrated Circuit (ASIC) chip or a Field Programmable Gate Array (FPGA). The texture memory 162 in FIG. 1 may comprise an EEPROM, DRAM, SDRAM, flash memory or other suitable storage unit. Similarly, the texture cache 166 may comprise an EEPROM, DRAM, SDRAM, flash memory or other suitable storage unit. In one embodiment, the texture cache 166 is implemented on-chip with the texturing engine 170.

The texture memory controller 164 in FIG. 1 may comprise a microcontroller with firmware or be included as part of a larger ASIC or FPGA. The texture cache control registers 168 may comprise an array of registers. In one embodiment, the texture cache control registers 168 are implemented in the texture memory controller 164. The texturing engine 170, rasterizer 174 and rendering engine 172 may be separate or an integrated unit. The texturing engine 170, rasterizer 174 and rendering engine 172 may comprise an integrated circuit with a microcontroller and firmware.

The components in FIG. 1 are coupled to each other by a plurality of lines 164A, 164B, 164C, 164D, 166A, 170A. Each line 164A, 164B, 164C, 164D, 166A, 170A may comprise a single line, a plurality of lines, a bus, a combination of single lines and buses, or some other suitable type of address and/or data transfer means.

In operation, the texture memory controller 164 of FIG. 1 receives new textures sent by a host computer (not shown) with pre-set attributes for each texture. The texture memory controller 164 stores the new textures in the texture memory 162 via line 164D.

Figure 2:
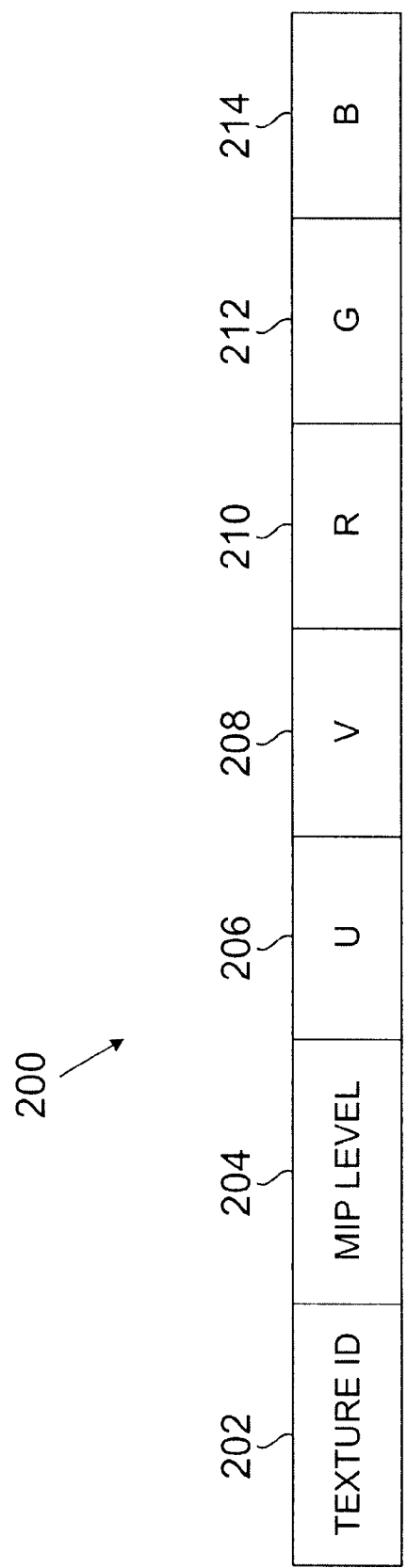
FIG. 2 illustrates one embodiment of a texel data packet stored in the texture memory of FIG. 1.

FIG. 2 illustrates one embodiment of a texel data packet 200 (referred to herein individually or collectively as '200') stored in the texture memory 162 of FIG. 1. Each packet 200 in FIG. 2 contains enough information to uniquely identify the color for an individual texel within a particular MIP level that is a member of a particular texture. Each texel data packet 200 comprises a texture ID field 202, a MIP level field 204, U, V fields 206, 208 and RGB fields 210–214. The texture ID field 202 identifies a texture (in the texture memory 162) from which a texel was read. The MIP level field 204 identifies a MIP level within the texture map (in the texture memory 162) from which the texel was read. The U, V fields 206, 208 are the texture coordinates within the MIP level from which the texel was read. The RGB fields 210–214 represent a texel color combination.

The texture memory controller 164 in FIG. 1 may pass a plurality of texel data packets 200 (FIG. 2) to the texture cache 166 via line 164A and to the texturing engine 170 via line 164C. The texture memory controller 164 uses the texture cache control registers 168 to store information about the texel data packets 200, such as the memory locations of the texel data packets 200 in the texture cache 166.

Figure 4A:
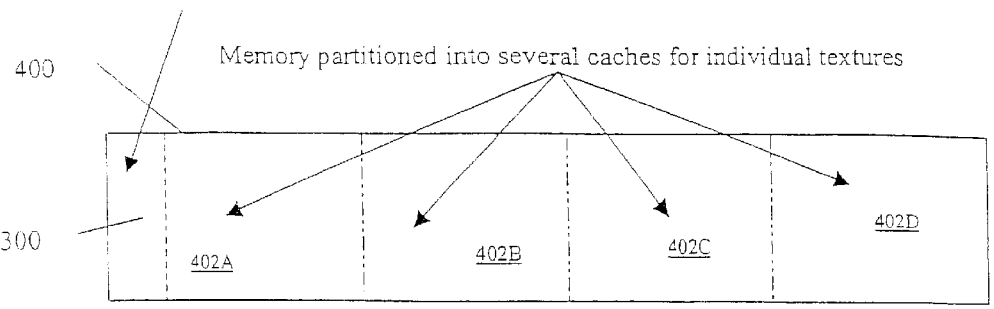
FIG. 4A illustrates one embodiment of a memory allocation for the texture cache in the texturing system of FIG. 1 in accordance with the present invention.

In one embodiment (described below with reference to FIG. 4A), the texture memory controller 164 removes the texture ID 202 (FIG. 2) from each packet 200 before storing the packet 200 in the texture cache 166. In FIG. 4A, each independently cached area (ICA) 402 is assigned to store texel data packets 200 for a particular texture, so the texture ID 202 in each texel data packet 200 is not needed.

The texture cache 166 of FIG. 1 stores texel data packets 200 (FIG. 2) that have been recently accessed by the texture memory controller 164. The texture cache 166 may store texels from multiple textures for a scene, such as textures for a ceiling, a floor and a throne, of a throne room in a computer game. Each texture is assigned to one ICA. The texture cache 166 may pass texel data packets 200 to the texturing engine 170 via line 166A.

FIG. 3A illustrates one embodiment of a traditional memory allocation for the texture cache 166 in FIG. 1. In one embodiment, the texture cache 166 is a circular queue, but in other embodiments, the texture cache 166 is not a circular queue. Most of the memory available in the texture cache 166 in FIG. 3A is configured to be a single area of memory 302 used to store texel data packets 200 (FIG. 2). A small portion of memory 300 in the texture cache 166 in FIG. 3A may be set aside for the texture memory controller 164 to provide temporary storage for texels held back due to pending reads by the rendering engine. For example, the small portion of memory 300 may store the memory address locations of the awaiting texel data packets 200 in the texture memory 160.

In one embodiment, the texturing engine 170 (FIG. 1) sends a request for one or more texel data packets 200 (FIG. 2) to the texture memory controller 164 via line 164C. The texture memory controller 164 determines whether some or all of the requested texel data packets 200 are in the texture cache 302 (FIG. 3A). If some or all of the requested texel packets 200 are within the texture cache 302, the texture memory controller 164 provides memory location addresses of the texel data packet 200 in the texture cache 302 to the texturing engine 170. The texturing engine 170 then reads the texel data packet 200 from the specified memory locations in the texture cache 302. Alternatively, the texture memory controller 164 directs the texture cache 166 to pass the requested texel packets 200 to the texturing engine 170.

For example, the texturing engine 170 (FIG. 1) may request texel packets 200 (FIG. 2) that have been used in a previous rendering process, such as for example, in a multi-texturing or semi-opaque surface rendering process. The texture cache 166 provides the requested texel data packets 200 to the texturing engine 170 faster than the texture memory controller 164 retrieving the requested texel packets 200 from the texture memory 162.

If some of the requested texel packets 200 (FIG. 2) are not in the cache 302 (FIG. 3A), then the texture memory controller 164 (FIG. 1) retrieves the requested texel packets 200 from the texture memory 162 via line 164D. The texture memory controller 164 passes the retrieved texel data packets 200 to the texture cache 302 via line 164A and the texturing engine 170 via line 164C. Alternatively, the texture cache 166 may pass the retrieved texel packets 200 to the texturing engine 170 via line 166A.

In one embodiment, the texture memory controller 164 (FIG. 1) sends an interrupt signal to the texturing engine 170 via line 164C to indicate when retrieved texel packets 200 (FIG. 2) are in the texture cache 302 (FIG. 3A) and ready for retrieval. The texturing engine 170 retrieves the texel packets 200 directly from the texture cache 166 or directs the texture memory controller 164 to provide memory location addresses of the texel data packet 200 in the texture cache 302 to the texturing engine 170. The texturing engine 170 then reads the texel data packet 200 from the specified memory locations in the texture cache 302.

The texture memory controller 164 in FIG. 1 places new texel data packets 200 (FIG. 2) in the cache 302 of FIG. 3A. FIGS. 3B–3F illustrate exemplifying memory configurations of the texture cache 166 in FIG. 3A after a plurality of retrieved texel data packets 200 (FIG. 2) have been written by the texture memory controller 164 (FIG. 1). In FIGS. 3B–3F, the cache 302 has been set up as simple circular queue, but other memory formats may be used.

In FIGS. 3B–3F, the texel data packets 200 in the conventional cache 302 may be associated with a plurality of different textures, such as textures labeled 'A–E,' in the texture memory 162. In other words, the single cache 302 stores texel data packets 200 for all textures in the texture memory 162 that are requested by the texturing engine 170. For example, the area 304 in cache 302 in FIG. 3B is storing texel data packets related to a first texture A that have been requested by the texturing engine 170 (FIG. 1). The remaining area 306 of the cache 302 in FIG. 3B is empty at the moment. In FIG. 3C, the area 304 is storing texel data packets related to the first texture A, and the area 310 is storing texel data packets related to a second texture B that have been requested by the texturing engine 170. In FIG. 3F, the area 322 is storing texel data packets related to a fifth texture E that have been requested by the texturing engine 170. As shown in FIGS. 3E and 3F, the texel data packets 200 of the fifth texture E have over-written some of the texel data packets 200 of the first texture A. Texel data packets 200 related to subsequent textures will over-write previously stored texel data packets.

In the traditional cache 302 shown in FIGS. 3A–3F, there are no provisions for dealing with texel data packets 200 (FIG. 2) that are frequently re-used by the texturing engine 170 (FIG. 1) compared to texel data packets 200 that are used only intermittently or infrequently. In FIGS. 3A–3F, a frequently re-used texel data packet 200 may be written over by the texture memory controller 164, reloaded again, written over and then reloaded again repeatedly. Thus, the operation of this type of cache 302 is inefficient. Even if the implementation is changed to use another method such as a multi-way associative cache the entire cache is still shared among all the texture maps and the inefficiency remains.

FIG. 4A illustrates one embodiment of a memory allocation for the texture cache 166 in FIG. 1 in accordance with the present invention. The memory allocation in FIG. 4A divides the texture cache 166 into a plurality of configurable Independently Cached Areas (ICAs) 402A–402D (referred to herein individually or collectively as '402'). Each ICA 402 is an independently mapped area that represents a dedicated cache. Each ICA 402 is assigned a configurable range of memory in the texture cache 166. Each ICA 402 stores texel data packets 200 (FIG. 2) associated with one texture in the texture memory 162. An ICA 402 may be implemented as anything from a simple circular queue to a set of lookup tables to a multi-way associative cache. The methodology and techniques used to implement what happens within an ICA may vary.

Although only four ICAs 402A–402D are shown in FIGS. 4A–4F, the texture cache 166 may have two or more configurable ICAs 402. The memory allocation in FIG. 4A solves the problem discussed above by reusing ICAs 402 for textures that are not being heavily used.

FIGS. 4B–4F illustrate exemplifying ICA configurations of the texture cache 166 in FIG. 4A after a plurality of retrieved texel data packets have been written by the texture memory controller 164 of FIG. 1. The texture memory controller 164 uses control registers 168 (FIG. 5) to map texel data packets 200 (FIG. 2) associated with different textures in the texture memory 162 (FIG. 1) to different ICAs 402A–402D (FIG. 4A) in the texture cache 166.

FIG. 5 illustrates one embodiment of an array 168 of texture cache control registers 501A–501F (referred to hereinafter individually or collectively as '501') used by the texture memory controller 164 (FIG. 1) to control the usage of the ICAs 402A–402D in FIG. 4A. Each register 501 in FIG. 5 is associated with a particular ICA 402 in FIG. 4A. Each register 501 in FIG. 5 comprises a texture ID field 502, which assigns texel data packets 200 (FIG. 2) associated with a particular texture to a particular ICA 402. If a texture in the texture memory 162 is not yet associated with an ICA 402 (FIG. 4A) in the texture cache 166, then the texture ID field 502 has a NULL entry.

Each register 501 in FIG. 5 comprises a memory location address 504 of the beginning of the ICA 402 in the texture cache 166 (FIG. 1). For example, the memory location address 504 may be an address offset from the beginning of the texture cache memory. Each register 501 comprises a size field 506 of an ICA 402. Each register 501 comprises a plurality of fields to indicate information, such as a texture usage indicator 508 and a 'CLOSED' flag 510. An asserted CLOSED flag 510 indicates when an ICA 402 will not accept any more texel data packets 200 (FIG. 200).

The texture usage indicator 508 (referred to herein individually and collectively as '508') in FIG. 5 may be configured to have any number of bits. The texture usage indicator 508 may be incremented or decremented using simple ASIC/FPGA integer ADD and SUBTRACT operations. When a texel data packet 200 (FIG. 2) is read from an ICA 402 (FIG. 4A), the texture usage indicator 508 related to that particular ICA 402 is incremented, and the texture usage indicators 508 related to the other ICAs 402 are decremented. In one embodiment, this increment/decrement feature is limited to those ICAs 402 that have assigned textures. In another embodiment, the increment/decrement feature is not limited to ICAs 402 that have assigned textures. The texture usage indicators 508 have a lower limit value, such as zero, and a configurable upper limit value, such as 255. Wrap-around is preferably not allowed.

A texture that is frequently used by the texturing engine 170 (FIG. 1) will have a significant texture usage indicator value associated with the texture's ICA 402. A texture that is rarely used by the texturing engine 170 will have a texture usage indicator value hovering around zero. If texel use is substantially even across all textures, then all of the usage indicators 508 will be around zero.

In one embodiment mentioned above, the texture ID 202 (FIG. 2) is removed before each texel data packet 200 is stored in an ICA 402 (FIG. 4A) of the texture cache 166 (FIG. 1). Thus, a texture ID is associated with an entire ICA 402 and not associated with an individual texel. By storing texel data packets 200 without a texture ID field 202, more cache memory in the ICAs 402A–402D is available to store texel data packets 200. In contrast, a texture cache 166 in FIG. 3A requires each texel data packet 200 to have a texture ID field 202.

Figure 4B:
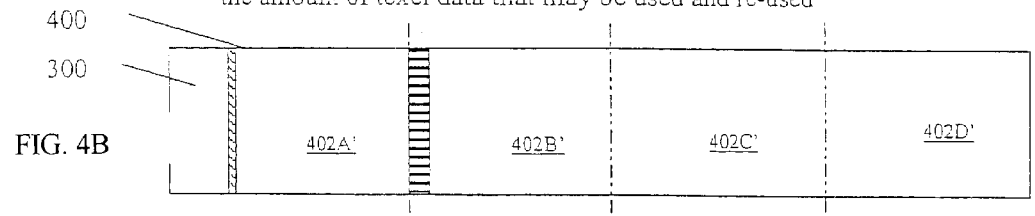
FIGS. 4B–4F illustrate exemplifying configurations of the texture cache in FIG. 4A after a plurality of retrieved texel data packets have been written by the texture memory controller of FIG. 1.
Figure 4C:
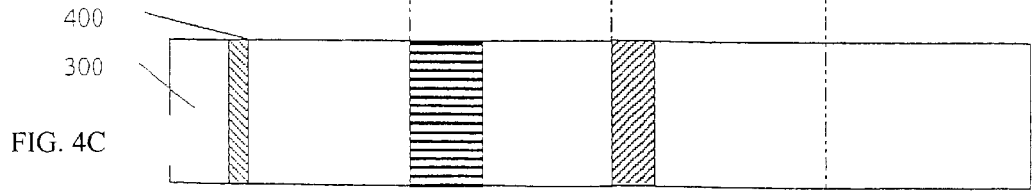

When the texturing engine 170 (FIG. 1) requests a texel data packet 200 (FIG. 2) for a texture that is not assigned to an ICA 402 (FIG. 4A) in the texture cache 166 (FIG. 1), the texture memory controller 164 determines whether all of the ICAs 402A–402D in the texture cache 166 are currently assigned to a texture. If there is an available ICA 402 (not assigned to a texture), that ICA 402 is assigned to the new texture and holds texel data packets 200 associated with the new texture. For example, FIG. 4A shows available ICAs 402A–402D, and FIG. 4B shows available ICAs 402C' and 402D'.

Figure 4D:
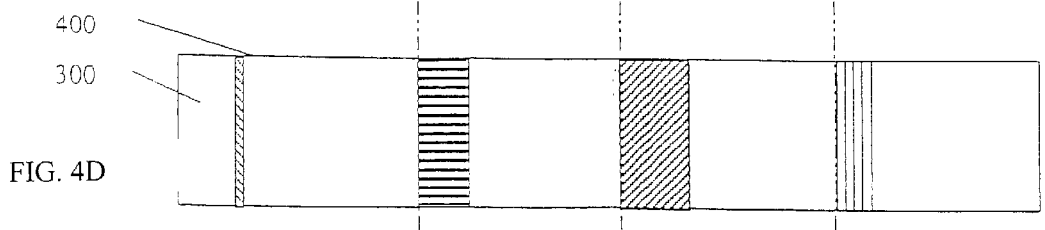

If all of the ICAs 402A–402D have assigned textures, such as FIG. 4D, a selection method (such as a round robin method) selects an ICA 402 that has a usage indicator value 508 (FIG. 5) at or near zero and a de-asserted CLOSED flag 510. For example, in FIG. 4D, the first cache 402A storing texel data packets 200 for texture A has a usage indicator value 508 (FIG. 5) at or near zero.

Figure 4E:
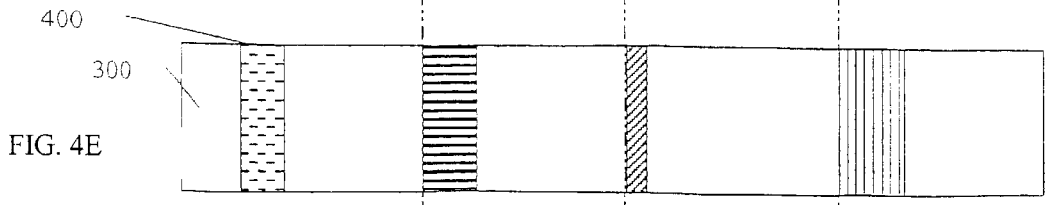
Figure 4F:
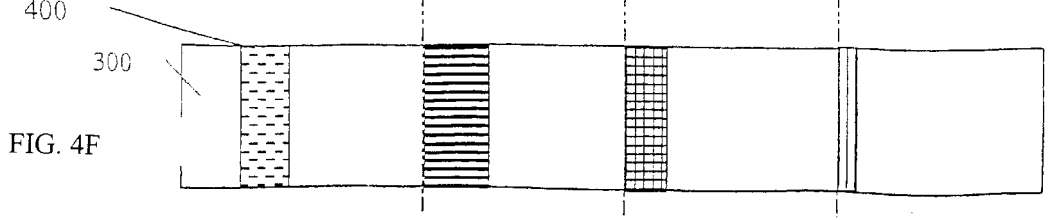

Once an ICA 402 is selected for the new texture, the CLOSED flag 510 of the selected ICA 402 is temporarily asserted to prevent (1) texel data packets 200 associated with the old assigned texture and (2) texel data packets 200 associated with the new texture to enter the selected ICA 402. When all pending read requests of old texel data packets 200 in that ICA 402 by the texturing engine 170 are complete or a certain time period has passed, the CLOSED flag 510 is de-asserted, the remaining packets 200 in the ICA 402 may be optionally erased, and the ICA 402 is assigned to store texel data packets 200 for the new texture. The texture memory controller 164 stores the texture ID of the new texture in the texture ID field 502 for that ICA 402. The texture memory controller 164 may then place texel data packets 200 related to the new texture in the assigned ICA 402A. Using the example above, FIG. 4E shows texel data packets of a new texture E stored in the first ICA 402A. FIG. 4F shows texel data packets of a new texture F stored in the third ICA 402C.

In another embodiment, the methods described above are applied to a CPU cache with ICAs, which are used to individually hold data on the basis of a thread, task or process. In addition, each ICA may be implemented as the type of N-way associative cache typically used by CPU designs.

The above-described embodiments of the present invention are merely meant to be illustrative and not limiting. Various changes and modifications may be made without departing from the invention in its broader aspects. The appended claims encompass such changes and modifications within the spirit and scope of the invention.

What is claimed is:

1. A memory system comprising:
   a memory configured to store a plurality of data packets, the data packets being associated with a plurality of data types;
   a memory controller coupled to the memory, the memory controller being configured to receive requests for data packets from a processing unit and pass requested data packets from the memory to the processing unit; and
   a cache coupled to the memory controller, the cache comprising a plurality of independently cached areas, the memory controller being configured to pass requested data packets from the memory to the cache, the memory controller being configured to pass requested data packets from the cache to the processing unit in response to subsequent data packet requests from the processing unit to the memory controller, the memory controller being configured to assign each independently cached area in the cache to store data packets associated with one data type, each independently cached area being associated with a data usage indicator, the memory controller being configured to (1) increment the data usage indicator of an independently cached area for each data packet passed from that independently cached area to the processing unit in response to a subsequent data packet request and (2) decrement the data usage indicators of other independently cached areas.

2. The memory system of claim 1, wherein the data packets comprise texel data packets, and the plurality of data types comprises a plurality of textures.

3. The system of claim 2, wherein each texel data packet stored in the memory comprises a texture ID, a MIP level, U-V coordinates and a color value, the memory controller removing the texture ID from each texel data packet before storing the texel data packet in the cache.

4. The memory system of claim 1, wherein the processing unit comprises a hardware-based texturing engine.

5. The memory system of claim 1, wherein each packet is associated with a single texture.

6. The memory system of claim 1, wherein each packet is associated with a single thread.

7. The memory system of claim 1, wherein each packet is associated with a single task.

8. The memory system of claim 1, wherein each packet is associated with a single process.

9. The memory system of claim 1, further comprising a plurality of control registers in the memory controller, each control register storing a data type assigned to an independently cached area and a data usage indicator of that independently cached area.

10. The memory system of claim 1, further comprising a plurality of control registers coupled to the memory controller, each control register storing a data type assigned to an independently cached area and a data usage indicator of that independently cached area.

11. The memory system of claim 10, wherein each control register further stores a memory location of an independently cached area in the cache.

12. The memory system of claim 10, wherein each control register further stores a size of an independently cached area in the cache.

13. The memory system of claim 10, wherein each control register further stores a flag, the memory controller asserting a flag related to an independently cached area when the memory controller selects that independently cached area to store data packets related to a data type that has not been assigned to an independently cached area, the memory controller de-asserting that flag when any pending requests for data packets in the independently cached area are complete.

14. The memory system of claim 1, wherein the data packets comprise CPU processes, and the plurality of data types comprises a plurality of types of processes.

15. A method of storing data, the method comprising:
storing a plurality of data packets in a memory, the data packets being associated with a plurality of data types;
receiving requests for data packets from a processing unit with a memory controller coupled to the memory and passing requested data packets from the memory to the processing unit;
passing requested data packets from the memory to a cache and passing requested data packets from the cache to the processing unit in response to subsequent data packet requests from the processing unit to the memory controller, the cache comprising a plurality of independently cached areas;
assigning each independently cached area in the cache to store data packets associated with one data type, each independently cached area being associated with a data usage indicator;
incrementing the data usage indicator of an independently cached area for each data packet passed from that independently cached area to the processing unit in response to a subsequent data packet request; and
decrementing the data usage indicators of other independently cached areas.

16. The method of claim 15, wherein the data packets comprise texel data packets, and the plurality of data types comprises a plurality of textures.

17. The method of claim 15, wherein each texel data packet stored in the memory comprises a texture ID, a MIP level, U-V coordinates and a color value, the memory controller removing the texture ID from each texel data packet before storing the texel data packet in the cache.

18. The method of claim 15, wherein the processing unit comprises a hardware-based texturing engine.

19. The method of claim 15, wherein each packet is associated with a single texture.

20. The method of claim 15, wherein each packet is associated with a single thread.

21. The method of claim 15, wherein each packet is associated with a single task.

22. The method of claim 15, wherein each packet is associated with a single process.

23. The memory of claim 15, further comprising storing (1) a data type assigned to an independently cached area and (2) a data usage indicator of that independently cached area in a control register.

24. The method of claim 15, further comprising storing a memory location of an independently cached area in the cache.

25. The method of claim 15, further comprising storing a size of an independently cached area in the cache.

26. The method of claim 15, further comprising:
storing a flag in each control register;
asserting a flag related to an independently cached area when the memory controller selects that independently cached area to store data packets related to a data type that has not been assigned to an independently cached area; and
de-asserting that flag when any pending requests for data packets in the independently cached area are complete.

27. The method of claim 15, wherein the data packets comprise CPU processes, and the plurality of data types comprises a plurality of types of processes.

28. A computer readable medium for storing data, said computer readable medium containing program instructions that, when loaded into a processor, cause the processor to perform the steps of
staring a plurality of data packets in a memory, the data packets being associated with a plurality of data types;
receiving requests for data packets from a processing unit with a memory controller coupled to the memory and passing requested data packets from the memory to the processing unit; and
passing requested data packets from the memory to a cache and passing requested data packets from the cache to the processing unit in response to subsequent data packet requests from the processing unit to the memory controller, the cache comprising a plurality of independently cached areas;
assigning each independently cached area in the cache to store data packets associated with one data type, each independently cached area being associated with a data usage indicator;
incrementing the data usage indicator of an independently cached area for each data packet passed from that independently cached area to the processing unit in response to a subsequent data packet request; and
decrementing the data usage indicators of other independently cached areas.

29. The medium of claim 28, wherein the data packets comprise texel data packets, and the plurality of data types comprises a plurality of textures.

30. The medium of claim 28, wherein each texel data packet stored in the memory comprises a texture ID, a MW level, thy coordinates and a color value, the memory controller removing the texture ID from each texel data packet before storing the texel data packet in the cache.

31. The medium of claim 28, wherein the processing unit comprises a hardware-based texturing engine.

32. The medium of claim 28, wherein each packet is associated with a single texture.

33. The medium of claim 28, wherein each packet is associated with a single thread.

34. The medium of claim 28, wherein each packet is associated with a singe task.

35. The medium of claim 28, wherein each packet is associated with a single process.

36. The medium of claim 28, further comprising storing (1) a data type assigned to an independently cached area and (2) a data usage indicator of that independently cached area in a control register.

37. The medium of claim 28, thither comprising storing a memory location of an independently cached area in the cache.

38. The medium of claim 28, further comprising storing a size of an independently cached area in the cache.

39. The medium of claim 28, tither comprising:

storing a flag in each control register;

asserting a flag related to an independently cached area when the memory controller selects that independently cached area to store data packets related to a data type that has not been assigned to an independently cached area; and de-asserting that flag when any pending requests for data packets in the independently cached area are complete.

40. The medium of claim 28, wherein the data packets comprise CPU processes, and the plurality of data types comprise a plurality of types of processes.

* * * * *

UNITED STATES PATENT AND TRADEMARK OFFICE
CERTIFICATE OF CORRECTION

PATENT NO. : 6,604,175 B2
DATED : August 5, 2003
INVENTOR(S) : Thomas Patrick Dawson It is certified that error appears in the above-identified patent and that said Letters Patent is hereby corrected as shown below:

Column 2,
Line 57, before "in" change "areas" to -- area --.

Column 10,
Line 18, after "of", insert -- : --.
Line 19, first word, change "staring" to -- storing --.
Line 45, last word, change "MW" to -- MIP --.
Line 46, after "level,", change "thy" to -- U-V --.

Column 11,
Line 1, after "28," change "tither" to -- further --.

Signed and Sealed this

Thirteenth Day of January, 2004

JON W. DUDAS
*Acting Director of the United States Patent and Trademark Office*